US012479114B2

(12) United States Patent
Veldman

(10) Patent No.: US 12,479,114 B2
(45) Date of Patent: Nov. 25, 2025

(54) KNIFE OPENER

(71) Applicant: Jason Veldman, New Market, TN (US)

(72) Inventor: Jason Veldman, New Market, TN (US)

( * ) Notice: Subject to any disclaimer, the term of this patent is extended or adjusted under 35 U.S.C. 154(b) by 140 days.

(21) Appl. No.: 18/504,507

(22) Filed: Nov. 8, 2023

(65) Prior Publication Data

US 2025/0144824 A1 May 8, 2025

(51) Int. Cl.
*B26B 1/02* (2006.01)

(52) U.S. Cl.
CPC .................................... *B26B 1/02* (2013.01)

(58) Field of Classification Search
CPC .... B26B 1/00; B26B 1/02; B26B 1/04; B26B 1/042; B26B 1/044; B26B 1/046; B26B 1/048; B26B 1/06
USPC ......... 30/155, 156, 157, 158, 159, 160, 161, 30/164
See application file for complete search history.

(56) References Cited

U.S. PATENT DOCUMENTS 5,009,008 A * 4/1991 Yablonovitch ............ B26B 1/02 30/321
5,689,885 A * 11/1997 Walston .................... B26B 1/04 30/160
10,518,426 B1 * 12/2019 Riel ........................ B26B 11/00
2011/0119835 A1 * 5/2011 Bates ........................ B67B 7/44 7/155

OTHER PUBLICATIONS

7 Different Types of Plastic by A & C Plastics, Inc., obtained from https://www.acplasticsinc.com/informationcenter/r/7-different-types-of-plastic-and-how-they-are-used on Jun. 9, 2025.*
Bhandari, Surya; Design, Simulation and Analysis of Bottle Opener for Injection Moulding; 2022; Arcada University (Year: 2022).*
The Emerson Wave Shaped Feature, Emerson Knives, dated Mar. 28, 2013, at https://emersonknives.com/video/wave-shaped-feature/ (5 pages).

* cited by examiner

*Primary Examiner* — Evan H Macfarlane
(74) *Attorney, Agent, or Firm* — Robinson IP Law, PLLC

(57) ABSTRACT

Various implementations include a folding blade attachment device. The device includes a body having a first portion and a second portion extending along opposing sides of the blade. Each of the first and second portions define a thumb stud opening. The body has a proximate end and a distal end configured to be closer to a tip of the blade. When the body is coupled to the blade, each of the thumb stud openings accepts a thumb stud extending from opposing sides of the blade to hingedly couple the device to the blade. The distal end of the body is hingedly biased toward an extended position in which it is spaced apart from the spine of the blade and is urgable toward a collapsed position. The distal end of the body is further from the spine of the blade in the extended position than it is in the collapsed position.

17 Claims, 2 Drawing Sheets

KNIFE OPENER

BACKGROUND

Different designs of folding knives include various mechanisms for assisting a user in opening the blade of the knife. Many of these designs include an extension that can be engaged by the thumb of a user to pry the knife blade open. However, these mechanisms can require a lot of thumb strength and positioning the knife so that the force from the thumb is directed for maximum torque. Thus, there is a need for an opening mechanism that can be incorporated on folding knives to allow a user to quickly and easily open the blade of a folding knife.

SUMMARY

Various implementations include a folding blade attachment device. The device includes a body having a first portion and a second portion. The first portion and the second portion extend along opposing sides of a blade when the body is coupled to the blade. Each of the first portion and second portion define a thumb stud opening. The body has a proximate end and a distal end opposite the proximate end. The distal end is configured to be closer to a tip of the blade when the body is coupled to the blade. When the body is coupled to the blade, each of the thumb stud openings accepts a thumb stud extending from each of the opposing sides of the blade to hingedly couple the device to the blade. The distal end of the body is hingedly biased toward an extended position in which the distal end of the body is spaced apart from a spine of the blade and is urgable toward a collapsed position. The distal end of the body is further from the spine of the blade in the extended position than it is in the collapsed position.

In some implementations, the device further includes an intermediate portion extending between the first portion and second portion and disposed adjacent the spine of the blade when the body is coupled to the blade. In some implementations, the first portion extends substantially perpendicular to the intermediate portion. In some implementations, the second portion extends substantially perpendicular to the intermediate portion.

In some implementations, a distal portion of the first portion and a distal portion of the second portion are spaced apart from the spine of the blade in the extended position.

In some implementations, the distal end of the body is hingedly biased toward the extended position by a spring force. In some implementations, the device further includes a tongue extending from the body. In some implementations, the tongue provides the spring force. In some implementations, the tongue extends from the distal end of body.

In some implementations, the tongue extends between the body and the spine of the blade when the body is coupled to the blade. In some implementations, the tongue contacts the spine of the blade in the extended position when the body is coupled to the blade.

In some implementations, the tongue includes a first bend to extend the tongue between the body and the spine of the blade. In some implementations, the tongue extends from distal end of body. In some implementations, the tongue includes a second bend at the distal end of the body or between the distal end of the body and the first bend to form a blunted contact surface adjacent the distal end of the body.

In some implementations, the tongue and the body are integrally formed.

In some implementations, the thumb stud opening defined by the first portion is alignable with the thumb stud opening defined by the second portion.

In some implementations, the thumb stud opening has a diameter in the range of 4.0 mm to 7.0 mm. in some implementations, the diameter of thumb stud opening is in the range of 5.1 mm to 6.1 mm. in some implementations, the diameter of thumb stud opening is substantially 6.1 mm.

In some implementations, the body includes a metal. In some implementations, the metal includes steel. In some implementations, the metal includes stainless steel.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

DETAILED DESCRIPTION

The devices, systems, and methods disclosed herein provide for a folding blade attachment device for aiding with opening of a folding knife. The device is couplable to the thumb studs of a folding knife (e.g., a pocket knife) such that the device can rotate about the thumb studs. The device includes a spring force mechanism, such as a resilient piece of metal, that biases a distal end of the device away from the spine of the blade of the knife to provide a space between the end of the device and the spine of the knife. A user can use this space like a barb or a hook to catch the device on the top edge of a pocket (e.g., of the user's pants) to pry the blade of the knife to an open position. This allows the user to remove the knife from a pocket and open the knife with one hand. Because the distal end of the device is biased away from the spine by a spring force, the end of the device can be urged toward the spine of the device by the inside of the user's pocket or the contents of the pocket to prevent the device from getting unintentionally caught inside of the pocket.

Various implementations include a folding blade attachment device. The device includes a body having a first portion and a second portion. The first portion and the second portion extend along opposing sides of a blade when the body is coupled to the blade. Each of the first portion and second portion define a thumb stud opening. The body has a proximate end and a distal end opposite the proximate end. The distal end is configured to be closer to a tip of the blade when the body is coupled to the blade. When the body is coupled to the blade, each of the thumb stud openings accepts a thumb stud extending from each of the opposing sides of the blade to hingedly couple the device to the blade.

The distal end of the body is hingedly biased toward an extended position in which the distal end of the body is spaced apart from a spine of the blade and is urgable toward a collapsed position. The distal end of the body is further from the spine of the blade in the extended position than it is in the collapsed position.

Figure 1:
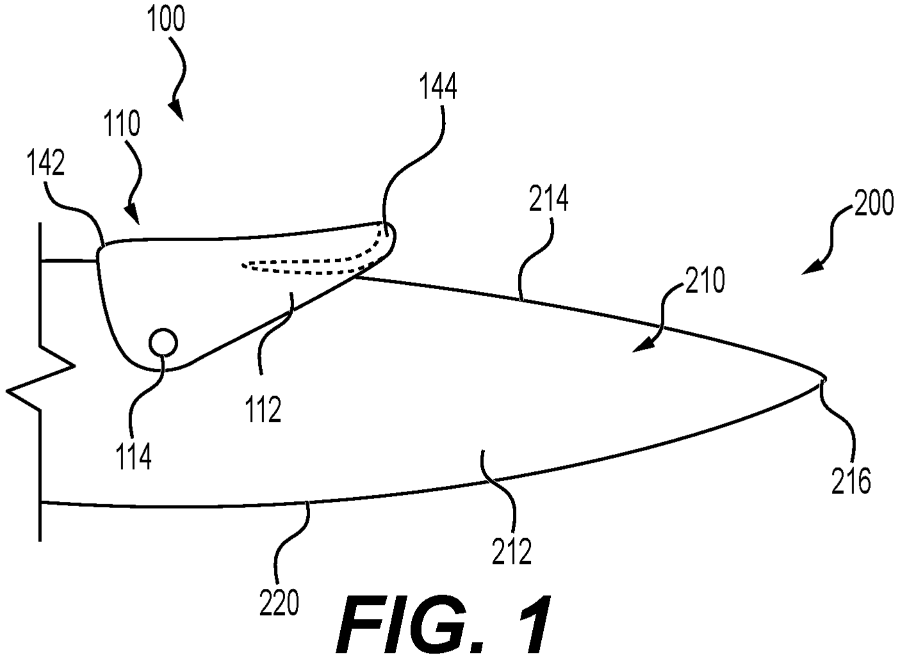
FIG. 1 is aside view of a folding blade attachment device coupled to the blade of a knife, according to one implementation.
Figure 2:
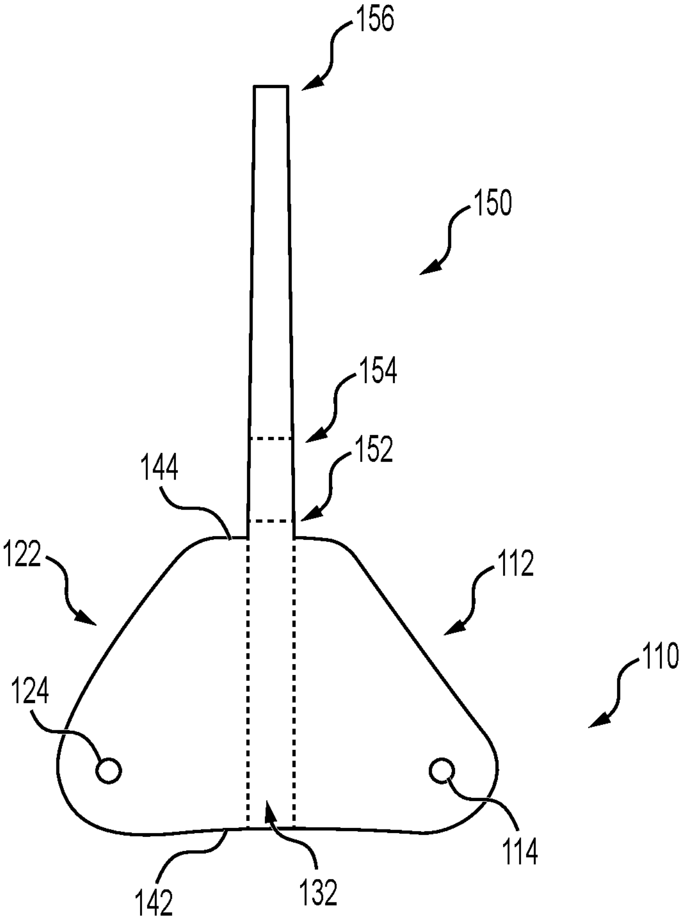
FIG. 2 is a top view of the folding blade attachment device of FIG. 1 prior to being bent into its finished shape.
Figure 3:
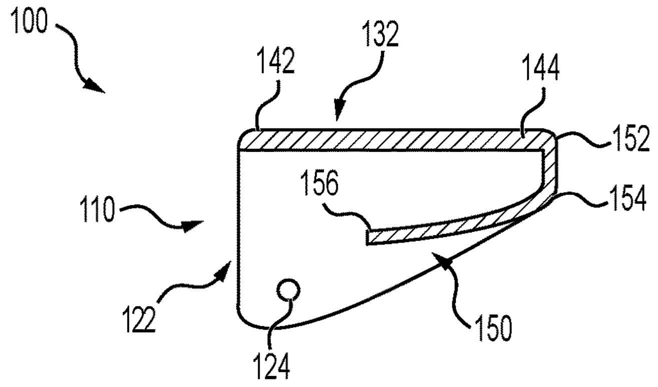
FIG. 3 is a cross-sectional view of the folding blade attachment device of FIG. 1 showing the tongue.
Figure 4:
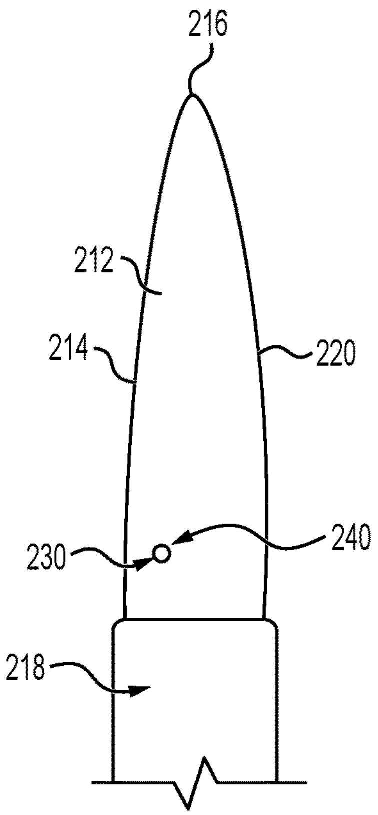
FIG. 4 is a side view of the knife of FIG. 1 with thumb studs.
Figure 5:
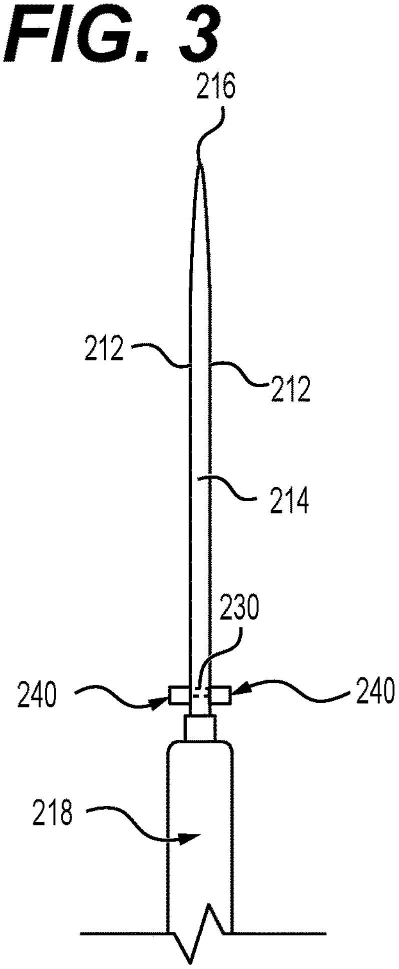
FIG. 5 is atop view of the knife of FIG. 1 with thumb studs.
Figure 6:
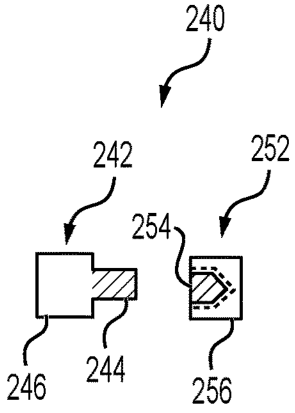
FIG. 6 is a detail view of the thumb stud of the knife of FIG. 1.

FIGS. 1-3 show a knife 200 with one implementation of a folding blade attachment device 100 coupled to the blade 210 of the knife 200. The knife 200, which is shown without the device 100 in FIGS. 4-6, is a folding blade style knife (e.g., a pocket knife). The blade 210 of the knife 200 incudes two opposing sides 212, a spine 214 extending between the two opposing sides 212, and a tip 216 opposite a handle 218. The two opposing sides 212 taper toward each other to form a cutting edge 220 opposite the spine 214.

The knife 200 defines a blade opening 230 extending from one of the sides 212 of the blade 210 to the other opposing side 212. A thumb stud 240 extends through the blade opening 230.

As shown in FIG. 6, the thumb stud 240 includes a male portion 242 and a female portion 252. The male portion 242 includes a threaded rod 244 extending from a first stud 246, and the female portion 252 includes a threaded opening 254 within a second stud 256. The threaded opening 254 of the female portion 252 is sized to threadingly receive the threaded rod 244 of the male portion 242. To couple the thumb stud 240 to the blade 210 of the knife 200, the threaded rod 244 is disposed within the blade opening 230. The blade opening 230 is sized such that the threaded rod 244 is insertable within the blade opening 230 but is small enough such that the first stud 246 and the second stud 256 cannot pass through the blade opening 230. The threaded opening 254 of the female portion 252 of the thumb stud 240 is then disposed over the threaded rod 244 and rotated to engage the threaded rod 244. The male portion 242 and female portion 252 of the thumb stud 240 clamp the opposing sides 212 of the blade 210 to couple the thumb stud 240 to the blade 210.

The device 100 includes a body 110 and a tongue 150. Although the body 110 and tongue 150 shown in FIGS. 1-3 are both made of stainless steel, in some implementations, the body and tongue are made of different materials. In some implementations, the body and/or tongue are made of any type of steel. In some implementations, the body and/or tongue are made of any metal, polymer, composite material, wood, or any other material capable of being formed into the shapes described herein.

The device 100 is shown in FIG. 2 in a flattened configuration prior to being bent into its final shape. The body 110 has a first portion 112, a second portion 122 opposite the first portion 112, and an intermediate portion 132 extending between the first portion 112 and second portion 122. The surfaces of the first portion 112 and the second portion 122 are oriented substantially perpendicular to the surfaces of the intermediate portion 132 and substantially parallel to each other.

The body 110 further has a proximate end 142 and a distal end 144 opposite the proximate end 142. The distal end 144 of the body 110 is configured to be closer to the tip 216 of the blade 210 when the body 110 is coupled to the blade 210.

The first portion 112 and the second portion 122 are configured such that, when the body 110 is coupled to the blade 210, the first portion 112 and the second portion 122 extend along opposing sides 212 of a blade 210 with the intermediate portion 132 disposed adjacent the spine 214 of the blade 210 when the body 110 is coupled to the blade 210.

Each of the first portion 112 and second portion 122 define a thumb stud opening 114, 124 extending through the respective portion 112, 122. The first portion 112 and second portion 122 being substantially parallel to each other allows the thumb stud opening 114 defined by the first portion 112 to be alignable with the thumb stud opening 124 defined by the second portion 122. Furthermore, the device 100 is configured such that the thumb stud openings 114, 124 of the first portion 112 and the second portion 122 are also alignable with the blade opening 230.

The device 100 can be coupled to the blade 210 of a knife 200 by first threadingly disengaging the male portion 242 of the thumb stud 240 from the female portion 252. The threaded rod 244 of the male portion 242 is then removed from the blade opening 230. The intermediate portion 132 of the device 100 is then placed over the spine 214 of the blade 210 such that the first portion 112 and second portion 122 of the device 100 are adjacent a separate one of the opposing sides 212 of the blade 210 and the distal end 144 of the body 110 is closer to the tip 216 of the blade 210. The thumb stud openings 114, 124 are then aligned with the blade opening 230, and the threaded rod 244 of the male portion 242 of the thumb stud 240 is inserted through the aligned thumb stud openings 114, 124 and blade opening 230. The threaded opening 254 of the female portion 252 of the thumb stud 240 is then threadingly engaged with the threaded rod 244 of the male portion 242 to recoupled the thumb stud 240 with the blade 210 of the knife 200.

The thumb stud openings 114, 124 have a diameter that is larger than the diameter of the thumb stud 240 such that each of the thumb stud openings 114, 124 can rotatably or hingedly accept a thumb stud 240. Thus, when the device 100 is coupled to the blade 210 of a knife 200, the device 100 is rotatable about a shared axis of rotation of the thumb stud openings 114 124 and the blade opening 230. Although the diameter of the thumb stud openings 114, 124 shown in FIGS. 1-3 is 6.1 mm, in some implementations, the diameter of thumb stud opening is in the range of 5.1 mm to 6.1 mm. In some implementations, the diameter of thumb stud opening is in the range of 4.0 mm to 7.0 mm. In some implementations, the diameter of thumb stud opening is any size large enough to rotatably receive any thumb stud of any blade of any knife.

The tongue 150 extends from the distal end 144 of the body 110. Although the tongue 150 shown in FIGS. 1-3 is integrally formed with the body 110, in some implementations, the tongue is separately formed from the body and can be coupled to the body by any known means. The tongue 150 includes a first bend 152 and a second bend 154. The second bend 154 is adjacent to the distal end 144 of the body 110 and angles a portion of the tongue 150 toward the spine 214 of the blade 210 of the knife 200. The surfaces of this portion of the tongue 150 are oriented substantially perpendicular to the surfaces of the intermediate portion 132. The first bend 152 is between a distal end 156 of the tongue 150 and the second bend 154. The first bend 152 angles the distal portion 156 of the tongue 150 to extend the tongue 150 between the body 110 and the spine 214 of the blade 210. Combined, the first bend 152 and the second bend 154 of the tongue 150 form a blunted contact surface adjacent the distal end 144 of the body 110.

The first bend 152 and the second bend 154 of the tongue 150 cause the distal end 156 of the tongue 150 to contact the spine 214 of the blade 210 to provide a spring force. The distal end 144 of the body 110 is hingedly biased by the spring force of the tongue 150 toward an extended position in which the distal end 144 of the body 110 is spaced apart from the spine 214 of the blade 210. The distal end 144 of the body 110 is also urgable toward a collapsed position. The distal end 144 of the body 110 is further from the spine 214 of the blade 210 in the extended position than it is in the collapsed position.

Although the spring force biasing the body 110 of FIGS. 1-3 toward the extended position is provided by the tongue 150, in some implementations, the spring force is provided by a spring or any other resilient mechanism. In some implementations, the device does not include a tongue. In some implementations, the tongue only includes a first bend that extends the tongue between the body and the spine of the blade. The tongue 150 shown in FIGS. 1-3 extends from the distal end 144 of the body 110, but in some implementations, the tongue extends from a proximal end of the body.

The distal portion 144 of the first portion 112 and the distal portion 144 of the second portion 122 of the body 110 are spaced apart from the spine 214 of the blade 210 in the extended position. This space between the distal portion 144 of the body 110 and the spine 214 of the blade 210 creates a hook or barb. When the knife 200 is in a folded configuration such that the cutting edge 220 of the blade 210 is disposed within the handle, and the knife 200 is within the pocket of a user, the spring force of the tongue 150 is light enough to allow the device 100 to be urged toward the collapsed position by the body 110 of the device 100 pressing against the inside of the pocket. This prevents a space between the spine 214 of the blade 210 and the distal end 144 of the body 110 of the device 100 from forming a barb or hook that could engage the pocket or the contents of the pocket.

When the knife 200 is removed from the pocket of the user, the tongue 150 biases the body 110 of the device 100 toward the extended position such that the space between the distal end 144 of the body 110 and the spine 214 of the blade 210 forms an exposed barb or hook. The user can slide the folded knife 200 against the top edge of the pocket such that the barb or hook engages the top edge of the pocket. The force of the user engaging the top edge of the pocket causes the blade 210 of the knife 200 to rotate toward an open position in which the cutting edge 220 of the blade 210 is exposed. In some implementations, the user can slide the folded knife against any edge of any object to engage the barb or hook with the edge to cause the blade of the knife to rotate toward the open position.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. An attachment device for a folding blade knife, the device comprising:

a body having a first portion and a second portion, the first portion and the second portion extending along opposing sides of a blade when the body is coupled to the blade, wherein each of the first portion and the second portion defines a respective thumb stud opening; and a cantilevered tongue extending from the body and positioned in-between the first portion and the second portion, wherein the body has a proximate end and a distal end opposite the proximate end, wherein the distal end is configured to be closer to a tip of the blade when the body is coupled to the blade, wherein, when the body is coupled to the blade, each of the thumb stud openings accepts a thumb stud extending from each of the opposing sides of the blade to hingedly couple the device to the blade, and wherein when the body is coupled to the blade, the distal end of the body is hingedly biased toward an extended position by a spring force from the tongue contacting a spine of the blade, wherein when the body is in the extended position the distal end of the body is spaced apart from the spine of the blade and is urgable toward a collapsed position, wherein when the body is coupled to the blade, the distal end of the body is further from the spine of the blade in the extended position than the distal end is in the collapsed position.

2. The device of claim 1, further comprising an intermediate portion extending between the first portion and the second portion and disposed adjacent the spine of the blade when the body is coupled to the blade.

3. The device of claim 2, wherein the first portion extends substantially perpendicular to the intermediate portion, wherein the second portion extends substantially perpendicular to the intermediate portion.

4. The device of claim 1, wherein a distal portion of the first portion and a distal portion of the second portion are spaced apart from the spine of the blade in the extended position.

5. The device of claim 1, wherein the tongue extends from the distal end of the body.

6. The device of claim 1, wherein the tongue extends between the body and the spine of the blade when the body is coupled to the blade.

7. The device of claim 6, wherein the tongue contacts the spine of the blade in the extended position when the body is coupled to the blade.

8. The device of claim 6, wherein the tongue includes a first bend to extend the tongue between the body and the spine of the blade.

9. The device of claim 8, wherein the tongue extends from the distal end of body, wherein the tongue includes a second bend at the distal end of the body or between the distal end of the body and the first bend, wherein the second bend forms a blunted contact surface adjacent the distal end of the body.

10. The device of claim 1, wherein the tongue and the body are integrally formed.

11. The device of claim 1, wherein the thumb stud opening defined by the first portion is alignable with the thumb stud opening defined by the second portion.

12. The device of claim 1, wherein each of the thumb stud openings has a diameter, wherein the diameter of each of the thumb stud openings is in the range of 4.0 mm to 7.0 mm.

13. The device of claim 12, wherein the diameter of each of the thumb stud openings is in the range of 5.1 mm to 6.1 mm.

14. The device of claim 13, wherein the diameter of each of the thumb stud openings is 6.1 mm.

15. The device of claim 1, wherein the body comprises a metal.

16. The device of claim 15, wherein the metal comprises steel.

17. The device of claim 16, wherein the metal comprises stainless steel.

* * * * *